US012769225B2

(12) United States Patent
Akagi

(10) Patent No.: US 12,769,225 B2
(45) Date of Patent: Oct. 20, 2026

(54) EXPOSURE HEAD AND IMAGE FORMING APPARATUS

(71) Applicant: CANON KABUSHIKI KAISHA, Tokyo (JP)

(72) Inventor: Daisuke Akagi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 22 days.

(21) Appl. No.: 18/739,043

(22) Filed: Jun. 10, 2024

(65) Prior Publication Data

US 2024/0419095 A1 Dec. 19, 2024

(30) Foreign Application Priority Data

Jun. 14, 2023 (JP) ................................ 2023-097771

(51) Int. Cl.
*G03G 15/04* (2006.01)
*G03G 15/00* (2006.01)

(52) U.S. Cl.
CPC ....... *G03G 15/04036* (2013.01); *G03G 15/80* (2013.01); *G03G 2215/0412* (2013.01)

(58) Field of Classification Search
USPC ........................................................ 399/88
See application file for complete search history.

(56) References Cited

U.S. PATENT DOCUMENTS 8,345,074 B2 1/2013 Okazaki

FOREIGN PATENT DOCUMENTS

| | | | | |
|---|---|---|---|---|
| CN | 1384512 A | * 12/2002 | | H01G 4/206 |
| JP | 2000156548 A | * 6/2000 | | |
| JP | 2012238724 A | * 12/2012 | | H05K 1/0231 |

OTHER PUBLICATIONS

Translation of JP2000-156548A, published Jun. 6, 2000 to Yamazaki (Year: 2000).*
Translation of abstract of JP2012-238724A, published Dec. 2012, to Adachi (Year: 2012).*
Text of Okazaki, U.S. Pat. No. 8,345,074 B2 with paragraph labels (Year: 2013).*
Computer Translation of CN1384512A, published Dec. 11, 2002 (Year: 2002).*

* cited by examiner

*Primary Examiner* — Quana Grainger
(74) *Attorney, Agent, or Firm* — Canon U.S.A., Inc. IP Division

(57) ABSTRACT

An exposure head includes a circuit board that is rectangular, a light emitting chip, an integrated circuit (IC), a power supply wire, and a bypass capacitor. The light emitting chip emits light to expose a photoconductor that is rotating. The light emitting chip includes a plurality of light emitting units arranged in a longer side direction of the circuit board, and the light emitting chip is disposed on a front surface of the circuit board. The IC is disposed on a back surface of the circuit board and transfers image data for controlling turn-on and turn-off of the plurality of light emitting units to the light emitting chip. The power supply wire supplies a current from a power source to the IC. The bypass capacitor is disposed on the front surface and is electrically connected to the power supply wire and a ground.

16 Claims, 12 Drawing Sheets

EXPOSURE HEAD AND IMAGE FORMING APPARATUS

BACKGROUND

Field

The present disclosure relates to an exposure head for use in an electrophotographic printer, and an image forming apparatus using the exposure head.

Description of the Related Art

In relation to an electrophotographic printer, there is generally known a method by which an exposure head with a light emitting diode (LED), an organic electroluminescence (EL), or the like is used to expose a photoconductive drum and form a latent image. The exposure head includes light emitting element rows arranged in a longer side direction of the photoconductive drum (hereinafter, main-scanning direction). U.S. Pat. No. 8,345,074 discusses a configuration of the exposure head in which an integrated circuit (IC) that transfers received image data to individual light emitting chips is provided on a circuit board on which the light emitting chips are mounted.

Since the above-described IC transmits and receives high-speed signals, an operating frequency and a consumed current are high, and a power supply voltage easily varies during operation. Thus, it is necessary to arrange bypass capacitors close to the IC to smooth the power supply voltage. However, since the exposure head needs to be arranged near the photoconductive drum, the size of the circuit board is limited in relation to adjacent members, and it may be difficult to arrange the bypass capacitors on the same surface as a surface of the circuit board on which the IC is provided.

SUMMARY

The present disclosure is directed to providing an exposure head that reduces a possibility of not being able to arrange the bypass capacitors close to the IC.

According to an aspect of the present disclosure, an exposure head includes a circuit board that is rectangular, a light emitting chip configured to emit light to expose a photoconductor that is rotating, wherein the light emitting chip includes a plurality of light emitting units arranged in a longer side direction of the circuit board, and the light emitting chip is disposed on a front surface of the circuit board, an integrated circuit (IC) disposed on a back surface of the circuit board and configured to transfer image data for controlling turn-on and turn-off of the plurality of light emitting units to the light emitting chip, a power supply wire configured to supply a current from a power source to the IC, and a bypass capacitor disposed on the front surface and configured to be electrically connected to the power supply wire and a ground.

Further features of the present disclosure will become apparent from the following description of exemplary embodiments with reference to the attached drawings.

DESCRIPTION OF THE EMBODIMENTS

Figure 1:
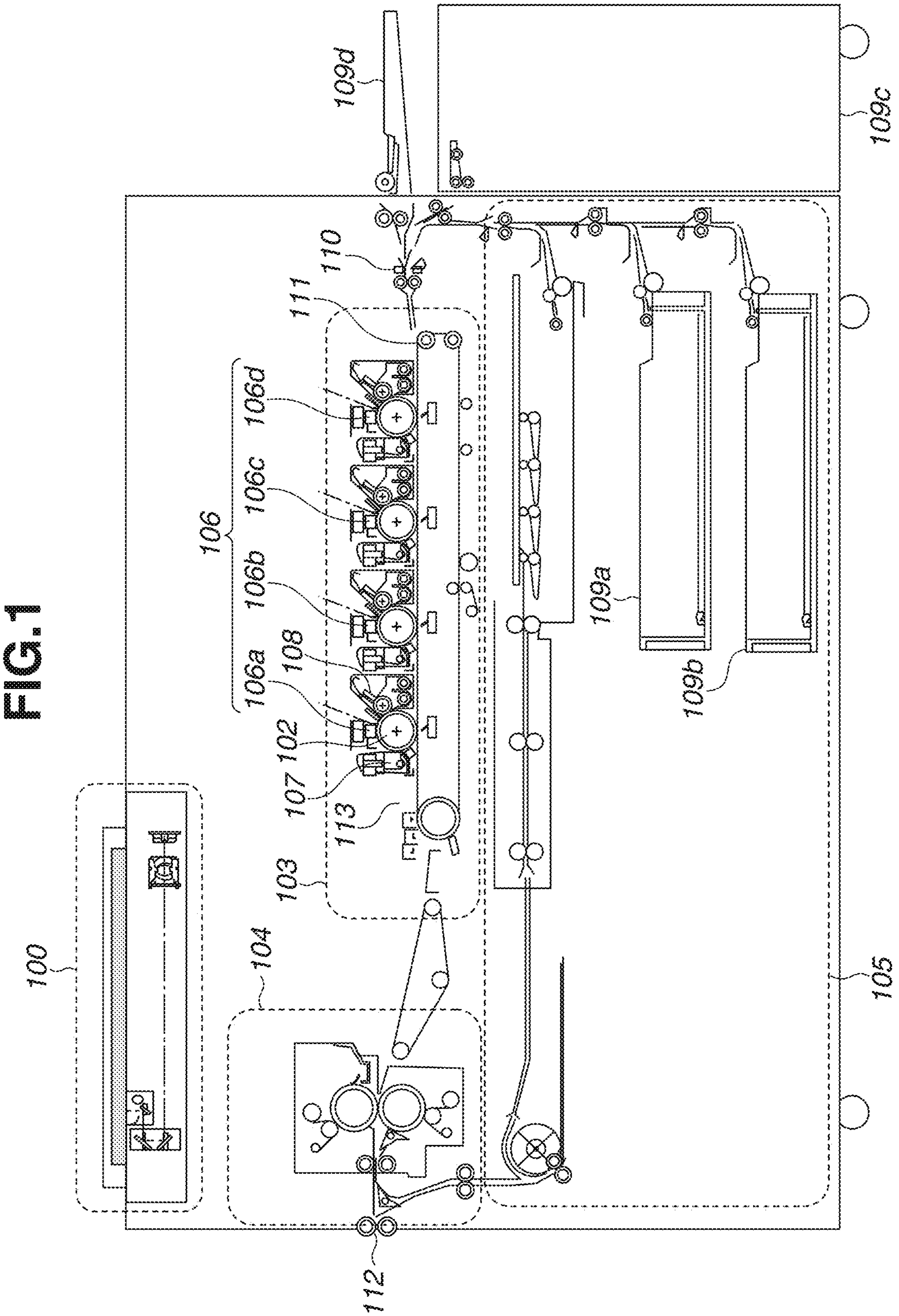
FIG. 1 is a diagram illustrating a configuration of an image forming apparatus according to first and second exemplary embodiments.

An electrophotographic image forming apparatus according to a first exemplary embodiment will be briefly described. FIG. 1 illustrates an overall configuration of the apparatus. The image forming apparatus includes a scanner unit 100, an image formation unit 103, a fixing unit 104, a paper feed/conveyance unit 105, and a printer control unit (not illustrated) that controls the above units.

The scanner unit 100 illuminates a document placed on a document platen glass, optically reads a document image, and converts the read image into an electrical signal, thereby generating image data. The image formation unit 103 rotationally drives a photoconductive drum 102 and electrically charges the photoconductive drum 102 with a charger 107.

Exposure heads 106*a* to 106*d* (collectively referred to as an exposure head 106) are turned on and off in accordance with the image data, collect light emitted from chip surfaces of a group of arranged light emitting elements by a rod lens array onto respective photoconductive drums 102, thereby generating electrostatic latent images. Development units 108 develop the electrostatic latent images formed on the photoconductive drums 102 with toner. Developed toner images are transferred onto paper having been conveyed on a transfer belt 111.

The image formation unit 103 has four image forming units that perform a series of electrophotographic processes (charging, exposure, development, and transfer) described above. The four image forming units are arranged in order of cyan (C), magenta (M), yellow (Y), and black (K) image forming units to form a full-color image. In the four image forming units, image formation is first started in a cyan station, and after a lapse of a predetermined time, image formation is successively executed in magenta, yellow, and black stations.

The paper feed/conveyance unit 105 feeds paper from a pre-specified paper feed unit among internal paper feed units 109*a* and 109*b*, an external paper feed unit 109*c*, and a manual paper feed unit 109*d*. The fed paper is conveyed to a registration roller 110. The registration roller 110 conveys the paper onto the transfer belt 111 at the timing of transferring the toner images, which are formed in the image formation unit 103 described above, onto the paper. An optical sensor 113 is arranged at a position facing the transfer belt 111, and detects the position of a printed test chart on the transfer belt 111 to derive an amount of color misalignment between the stations. The derived amount of color misalignment is notified to an image controller unit (not illustrated), and the positions of images of individual colors are corrected. Under this control, a full-color toner image without color misalignment is transferred onto the paper. The fixing unit 104 includes a combination of rollers, contains a heat source such as a halogen heater, melts and fixes, by heat and pressure, the toner on the paper onto which the toner image has been transferred from the transfer belt 111, and ejects the paper to the outside of the image forming apparatus by a paper ejection roller 112.

The printer control unit (not illustrated) communicates with a multi-function peripheral (MFP) control unit (not illustrated) that controls the overall MFP, and executes control in response to an instruction from the MFP control unit, and issues instructions for smooth operations of all the scanner unit, the image formation unit, the fixing unit, and the paper feed/conveyance unit in a harmonized manner.

Next, the exposure head 106 that exposes the photoconductive drum 102 will be described.

Figure 2A:
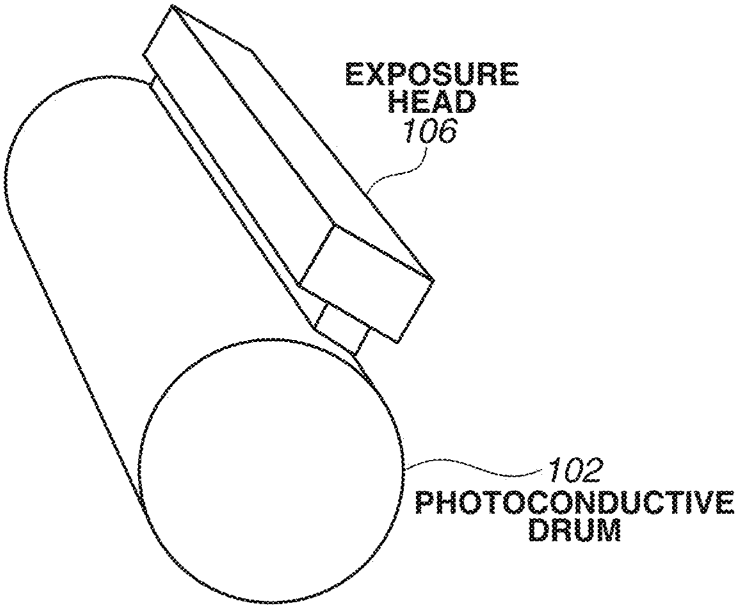
FIGS. 2A and 2B are diagrams illustrating arrangement of a photoconductive drum and an exposure head according to the first and second exemplary embodiments.
Figure 2B:
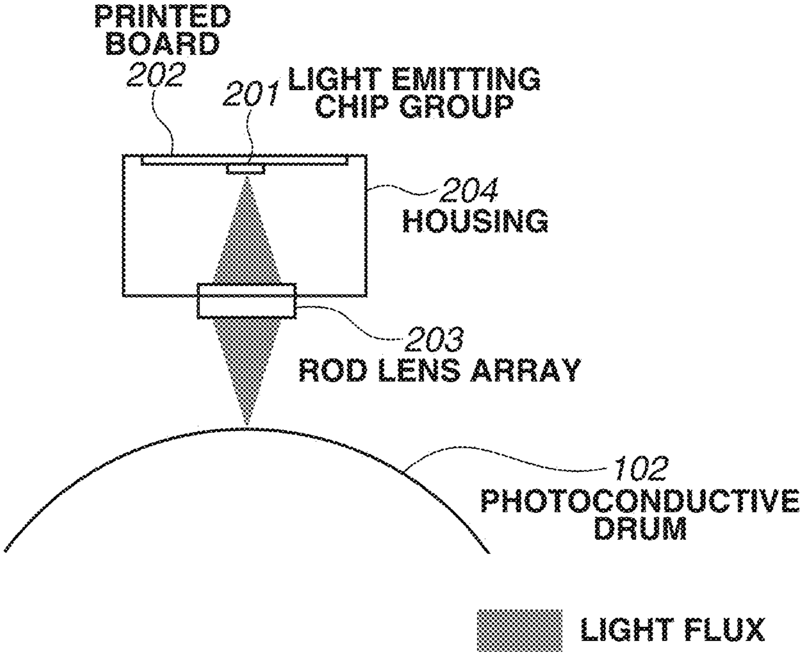

FIGS. 2A and 2B illustrate arrangement of the exposure head 106 with respect to the photoconductive drum 102 and collection of light emitted from a light emitting chip group 201 onto the photoconductive drum 102 by a rod lens array 203. The exposure head 106 and the photoconductive drum 102 are attached to the image forming apparatus by their respective attachment members (not illustrated). The exposure head 106 includes the light emitting chip group 201, a printed board 202 on which the light emitting chip group 201 is mounted, the rod lens array 203, and a housing 204 to which the rod lens array 203 and the printed board 202 are attached. At an assembly plant, the exposure head 106 is singly assembled and adjusted, subjected to focus adjustment to adjust a spot at a light collection position to a predetermined size, and subjected to light amount adjustment. The printed board 202 has an elongated shape with a longer side of the printed board 202 being longer in a direction of a rotation axis of the photoconductive drum 102, and the light emitting chip group 201 is provided in a longer side direction of the printed board 202. A distance between the photoconductive drum 102 and the rod lens array 203 and a distance between the rod lens array 203 and the light emitting chip group 201 are set to predetermined distances, so that the light emitted from the light emitting chip group 201 forms an image on the photoconductive drum 102. Accordingly, at the time of focus adjustment, an attachment position of the rod lens array 203 is adjusted such that the distance between the rod lens array 203 and the light emitting chip group 201 takes a desired value. At the time of the light amount adjustment, amounts of light emitted from light emitting chips are individually measured, and drive currents to the light emitting chips are adjusted such that a predetermined amount of light is collected via the rod lens array 203.

Figure 3A:
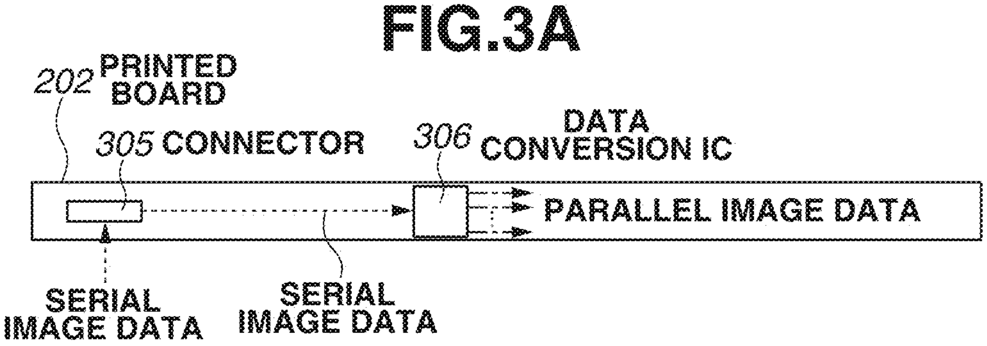
FIGS. 3A to 3C are diagrams illustrating a printed board according to the first and second exemplary embodiments.
Figure 3B:
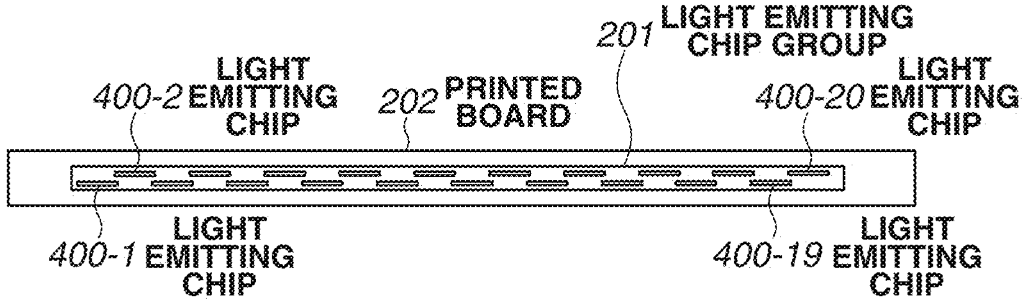
Figure 3C:
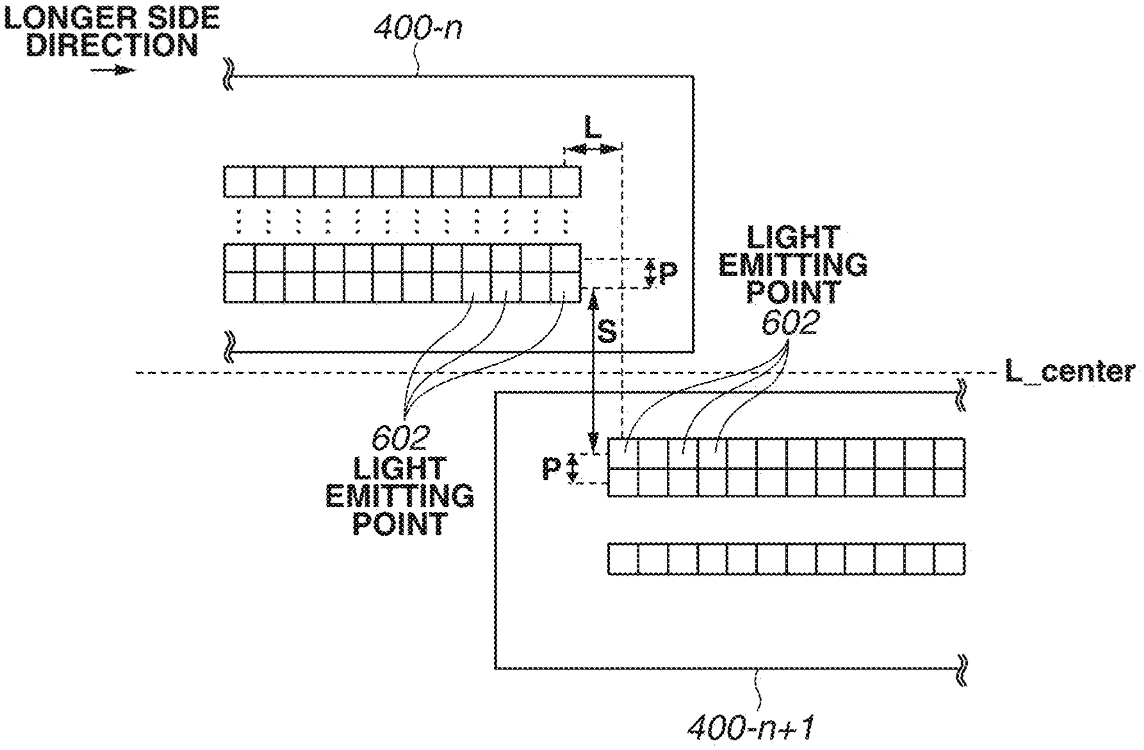

FIGS. 3A to 3C illustrate the printed board 202 on which the light emitting chip group 201, a connector 305, and a data conversion integrated circuit (IC) 306 (an example of an IC) are arranged.

FIG. 3A illustrates a surface of the printed board 202 (hereinafter, referred to as a light emitting chip-unmounted surface) opposite to a surface on which the light emitting chip group 201 is mounted, and FIG. 3B illustrates the surface of the printed board 202 on which the light emitting chip group 201 is mounted (hereinafter, referred to as a light emitting chip-mounted surface). In the present exemplary embodiment, the surface of the printed board 202 on which the light emitting chip group 201 is mounted is referred to as a front surface, and the surface of the printed board 202 on which the light emitting chip group 201 is not mounted is referred to as a back surface.

As illustrated in FIG. 3A, the connector 305 is mounted at an end of the light emitting chip-unmounted surface, and image data is input from an image controller described below to the connector 305 through a flexible flat cable (not illustrated). In the present exemplary embodiment, the image data is input as a pair of differential signals to the data conversion IC 306. The image data, which is serial data, will be hereinafter referred to as serial image data.

The data conversion IC 306 converts the input serial image data into 20 pieces of parallel image data, and transmits these pieces of image data to light emitting chips 400-1 to 400-20. The parallel image data is parallel data.

The light emitting chip group 201 is configured such that the 20 light emitting chips 400-1 to 400-20 are arranged in a staggered pattern. Each light emitting chip has light emitting points 602 arranged with predetermined pitches in a longer side direction and a shorter side direction of the chip. Light emission of the light emitting points 602 can be independently controlled based on the image data received from the data conversion IC 306.

In the present exemplary embodiment, 748 light emitting points 602 are arranged in a row in the longer side direction of the chip with a pitch of 1200 dpi resolution (about 21.16 μm), and a plurality of light emitting point rows is arranged in the shorter side direction of the chip. More specifically, a distance in the longer side direction between ends of the 748 light emitting points 602 in the chip is about 15.8 mm. Since the light emitting chip group 201 has the 20 light emitting chips 400 arranged in the longer side direction, 14960 light emitting points 602 are capable of exposure, so that image formation can be performed for an image with an image width of about 316 mm. The light emitting chips 400-1 to 400-20 are arranged in two rows in the staggered pattern, and the rows are arranged in the longer side direction of the printed board 202.

FIG. 3C illustrates a state of a boundary part between the light emitting chips 400. At the boundary part between the chips, a pitch in the longer side direction of the light emitting points 602 is a pitch of 1200 dpi resolution (about 21.16 μm). A space (indicated by S in the drawing) between the light emitting points 602 of adjacent chips 400 is about 127 μm (equivalent to six pixels at 1200 dpi). A space (indicated by L in the drawing) between the light emitting points 602 in the longer side direction of the exposure head 106 is about 21.16 μm (equivalent to one pixel at 1200 dpi). In the present disclosure, the spaces S and L between the light emitting chips are not limited to the foregoing values.

Although described below in detail, in the present exemplary embodiment, the plurality of light emitting point rows is arranged in the shorter side direction (sub-scanning direction) of the photoconductive drum.

On the light emitting chip-unmounted surface, there is arranged the connector 305 that receives control signals for controlling the light emitting chip group 201 from the image controller unit described below, and is connected with a power supply wire. The light emitting chip group 201 is driven via the connector 305.

Figure 4:
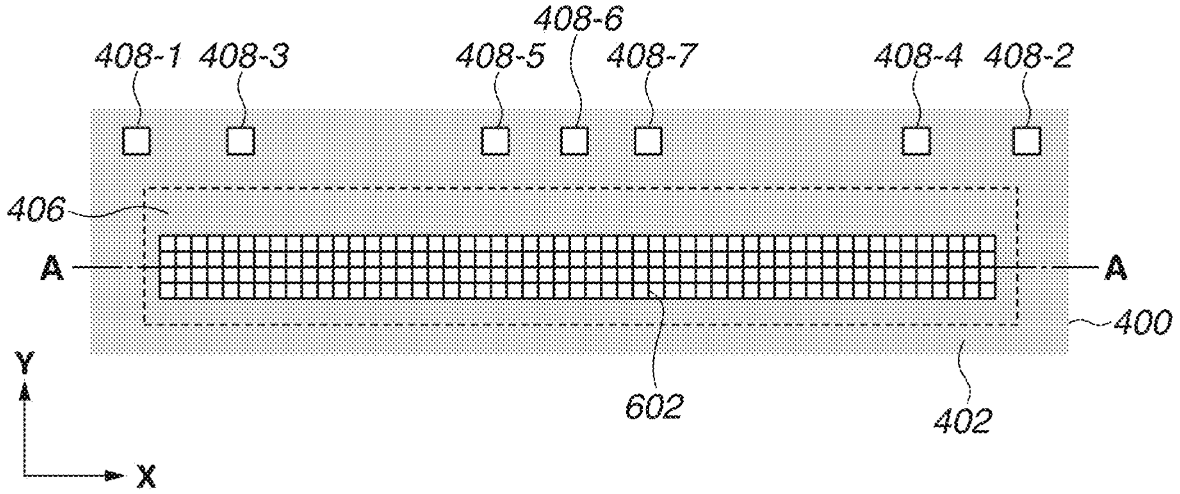
FIG. 4 is a diagram illustrating a planar configuration of light emitting chips according to the first or second exemplary embodiments.

FIG. 4 illustrates an outline of a planar configuration of a light emitting chip 400.

The light emitting chip 400 includes the plurality of light emitting points 602 and a plurality of wire bonding pads (hereinafter, referred to as WB pads) 408-1 to 408-7 on a light emitting board 402. The WB pads 408 are respectively connected with pads (not illustrated) on the printed board 202 by metal wires or the like.

The light emitting board 402 contains a circuit unit 406 that controls the light emission of the light emitting points 602. The circuit unit 406 may include an analog drive circuit or a digital control circuit, or both of them. Power supply to the circuit unit 406 and input and output of control signals to and from the circuit unit 406 are performed by the printed board 202 to the WB pads 408 via the metal wires. Details of the signals input to and output from the WB pads 408-1 to 408-7 will be described below.

As the light emitting board 402, a silicon (Si) substrate can be favorably used. Since processing technologies for formation of integrated circuits have been developed and Si substrates have already been used as substrates for various integrated circuits, it is possible to form a high-speed and high-functionality circuit at a high density. In addition, large-diameter Si wafers are in general distribution and are available inexpensively, which is an advantage in using the Si substrate.

A configuration of the light emitting points 602 will be described with reference to FIGS. 5, 6A, 6B, 6C, and 6D.

Figure 5:
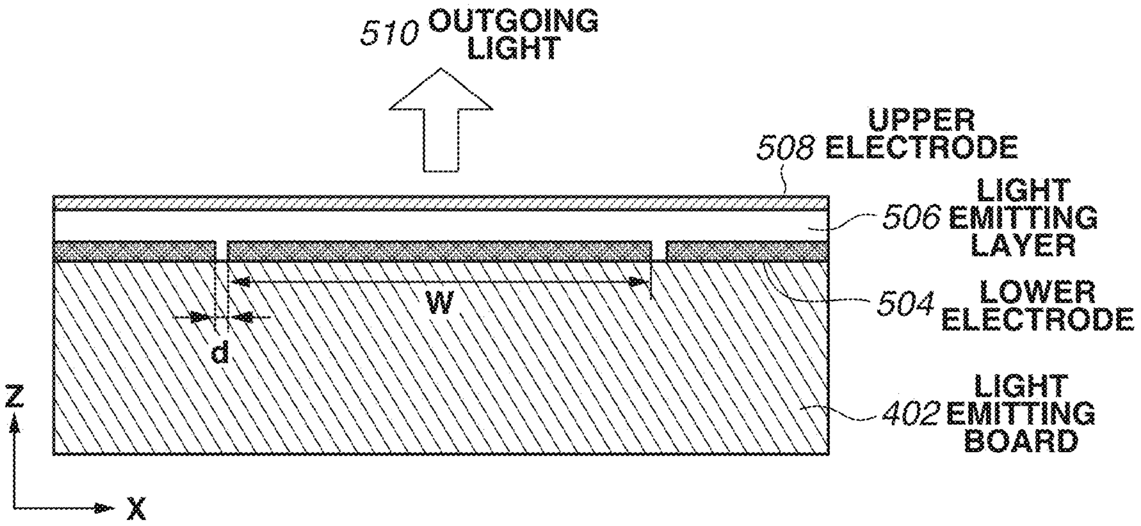
FIG. 5 is a cross-sectional view illustrating a configuration of the light emitting chip according to the first and second exemplary embodiments.

In the present exemplary embodiment, the plurality of light emitting points 602 refers to parts where the light emitting board 402 and an upper electrode 508 face each other. FIG. 5 is a partial schematic cross-sectional view of FIG. 4 taken along line A-A. A plurality of lower electrodes 504, a light emitting layer 506, and the upper electrode 508 are formed on the light emitting board 402. The lower electrodes 504 are independent electrodes for the corresponding light emitting points 602, and the upper electrode 508 is a common electrode. Each of the lower electrodes 504 is formed with a width w in the X direction and with a predetermined distance d from an adjacent lower electrode 504 in the X direction as illustrated in FIG. 5. The lower electrodes 504 are formed using an Si integrated circuit processing technology along with formation of the circuit unit 406 (not illustrated in FIG. 5) and are directly connected to a driving unit of the circuit unit 406 described below. Since the lower electrodes 504 are formed by the Si integrated circuit processing technology, the processing rule requires high accuracy of about 0.2 μm so that the lower electrodes 504 can be arranged with high precision and at a high density. In other words, since the light emitting positions of the light emitting points 602 are substantially the same as the positions of the lower electrodes 504, the light emitting points 602 can be arranged at a high density. The lower electrodes 504 can be preferably made of a metal with a high reflectivity to a light emitting wavelength of the light emitting layer 506, and Ag, Al, or an alloy thereof can be favorably used.

After formation of the lower electrodes 504, the light emitting layer 506 is formed on the lower electrodes 504. The light emitting layer 506 may be continuously formed or may be divided into a size almost equal to the size of the lower electrodes 504.

As the light emitting layer 506, an organic electroluminescence (EL) film or the like may be used, for example. In the case of using an organic EL film as the light emitting layer 506, the light emitting layer 506 may have a stacked structure that includes, as necessary, functional layers, such as an electron transport layer, a hole transport layer, an electron-injection layer, a hole-injection layer, an electron blocking layer, and a hole blocking layer. The light emitting layer 506 is not limited to an organic EL film and may be an inorganic EL film.

After formation of the light emitting layer 506 on the lower electrodes 504, the upper electrode 508 is formed on the light emitting layer 506. The upper electrode 508 is preferably transparent with respect to the light emitting wavelength of the light emitting layer 506, and a transparent electrode made of indium tin oxide (ITO) or the like may favorably be used. A desired electrode 504 is selected from among the plurality of lower electrodes 504, and the light emitting layer 506 is energized through the selected lower electrode 504 and the upper electrode 508. Accordingly, the light emitting layer 506 emits light at a position corresponding to the selected lower electrode 504, and outputs the light as outgoing light 510 through the upper electrode 508. As illustrated in FIG. 5, the light emitted from the light emitting layer 506 becomes the outgoing light 510 through the upper electrode 508 on the side opposite to the light emitting board 402.

Using a transparent electrode made of ITO or the like as the upper electrode 508 makes it possible to obtain substantially 100% opening ratio. In other words, the light from the light emitting layer 506 directly becomes the outgoing light 510. In addition, as described above, since the lower electrodes 504 can be formed and arranged at high density using a high-precision Si integrated circuit processing technology, it is possible to obtain light emission from most of the areas of the light emitting points 602 (defined here as a total of the areas of the lower electrodes 504 and the areas of parts for separating the adjacent lower electrodes 504), thereby enhancing the use efficiency.

In the case of using a moisture-sensitive material, such as an organic EL layer or an inorganic EL layer, as the light emitting layer 506, the light emitting layer 506 is desirably sealed to prevent intrusion of water into a light emitting unit. As a means for sealing, a sealing film is formed of a single-layer or multi-layer film of silicon oxide, silicon nitride, or aluminum oxide, for example. As a method for forming the sealing film, a method that provides excellent coating performance for a stepped structure and the like is desirable. For example, the atomic layer deposition (ALD) method can be used. The above-described material, configuration, and formation method of the sealing film are mere examples. The present disclosure is not limited to these examples, and a suitable material, configuration, and formation method can be used as appropriate.

Figure 6A:
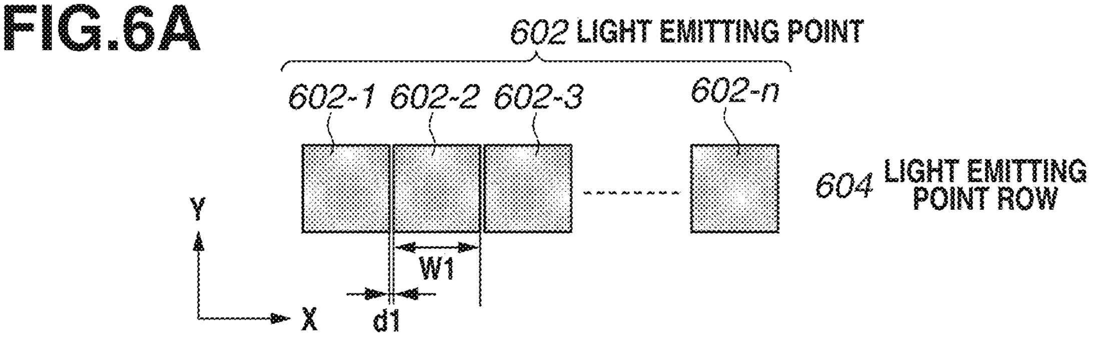
FIGS. 6A to 6D are diagrams illustrating an arrangement configuration of light emitting points according to the first and second exemplary embodiments.

FIG. 6A illustrates an example of a configuration in which the light emitting points 602 are arranged in a row. The plurality of light emitting points 602 is arranged in a row in the X direction indicated in the drawing at predetermined intervals therebetween, for example, with a pitch of 1200 dpi resolution, or a pitch of 21.16 μm, to form a light emitting point row 604. In the drawing, a width W1 indicates the width of each light emitting point 602 in the X direction, and a distance d1 indicates the distance between the adjacent light emitting points 602 in the X direction. If the light emitting layer 506 is sufficiently thin, the size of the light emitting point 602 is substantially the same as that of the lower electrode 504, whereby the width W1 can be regarded as the width W in FIG. 5, and the distance d1 can be regarded as the distance d in FIG. 5. In the present exemplary embodiment, the light emitting points 602 are arranged with the pitch of 21.16 μm, with the width W1 of 19.8 μm and the distance d1 of 1.36 μm.

Figure 6B:
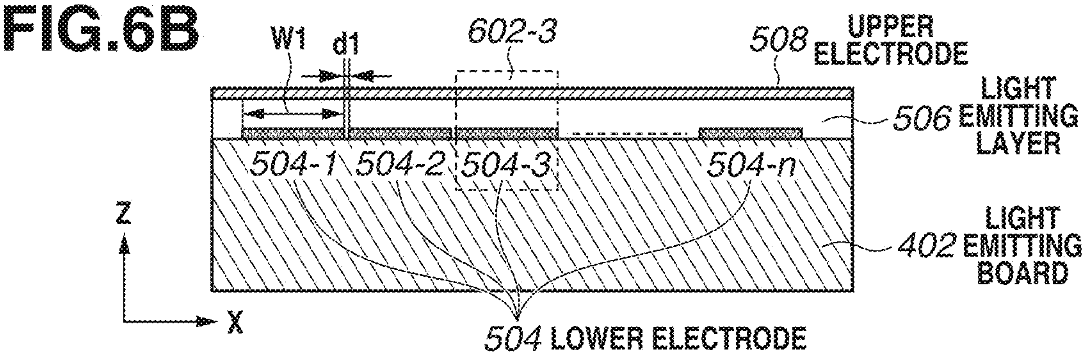

FIG. 6B is a schematic cross-sectional view of the light emitting point row 604. As illustrated in FIG. 6B, the lower electrodes 504 are arranged in the X direction indicated in the drawing, with the width W1 and the distance d1. Each individual light emitting point 602 includes a part of the upper electrode 508 facing the corresponding lower electrode 504, and the light emitting layer 506 between these electrodes.

Figure 6C:
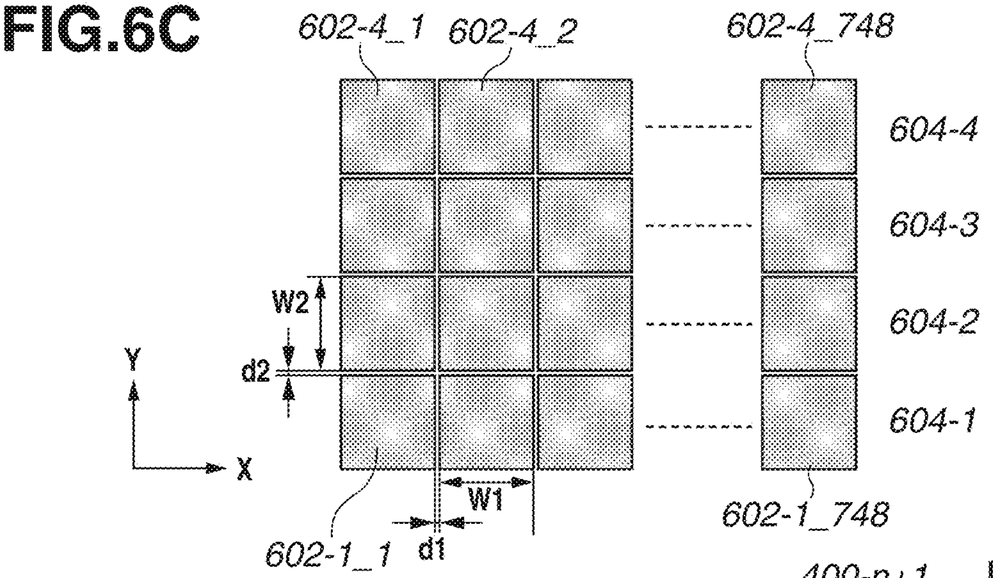

A plurality of light emitting point rows 604 may be arranged. FIG. 6C illustrates an example in which four light emitting point rows 604 are arranged in the Y direction indicated in the drawing. In the row direction (the X direction in the drawing), 748 light emitting points 602 are arranged, and in a direction (the Y direction in the drawing) orthogonal to the row direction, four columns of light emitting points 602 are arranged. In FIG. 6C, a width W2 indicates the width of each light emitting point 602 in the Y direction, and a distance d2 indicates the distance between the light emitting points 602 in the Y direction.

In the present exemplary embodiment, the light emitting points 602 are arranged at a pitch of 21.16 μm (1200 dpi) in the Y direction, with the width W2 of 19.8 μm similar to the width W1 and the distance d2 of 0.68 μm similar to the distance d1.

Figure 6D:
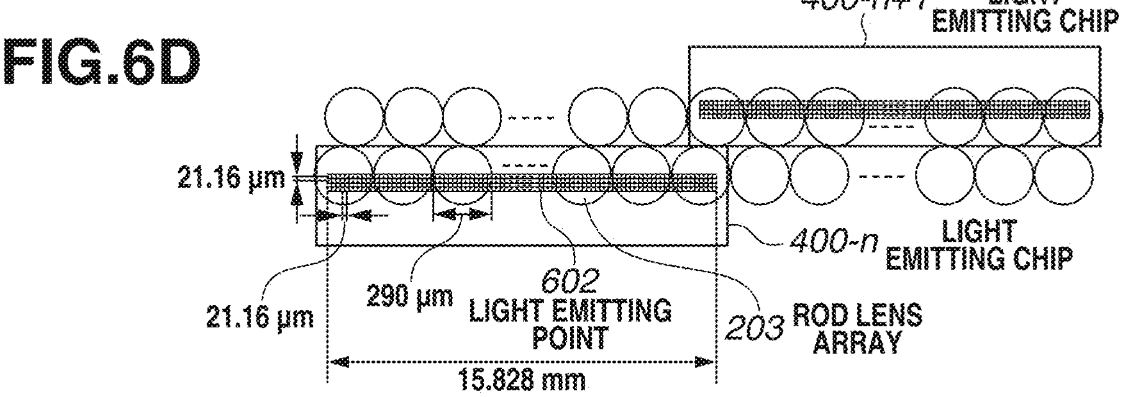

FIG. 6D is a planar view of a positional relationship between the light emitting unit and the rod lens array 203 according to the present exemplary embodiment.

Two rows of rod lenses are arranged in a staggered pattern on the light emitting chip 400-*n* to collect the light emitted from the plurality of light emitting points 602 onto the photoconductive drum.

In the present exemplary embodiment, the number of light emitting element rows in the Y direction is four, the pitch of the light emitting elements in the X direction is 21.16 μm, the pitch of the light emitting elements in the Y direction is 21.16 μm, the rod lens diameter is 290 μm, and one rod lens collects light emitted from a plurality of light emitting elements.

Figure 7:
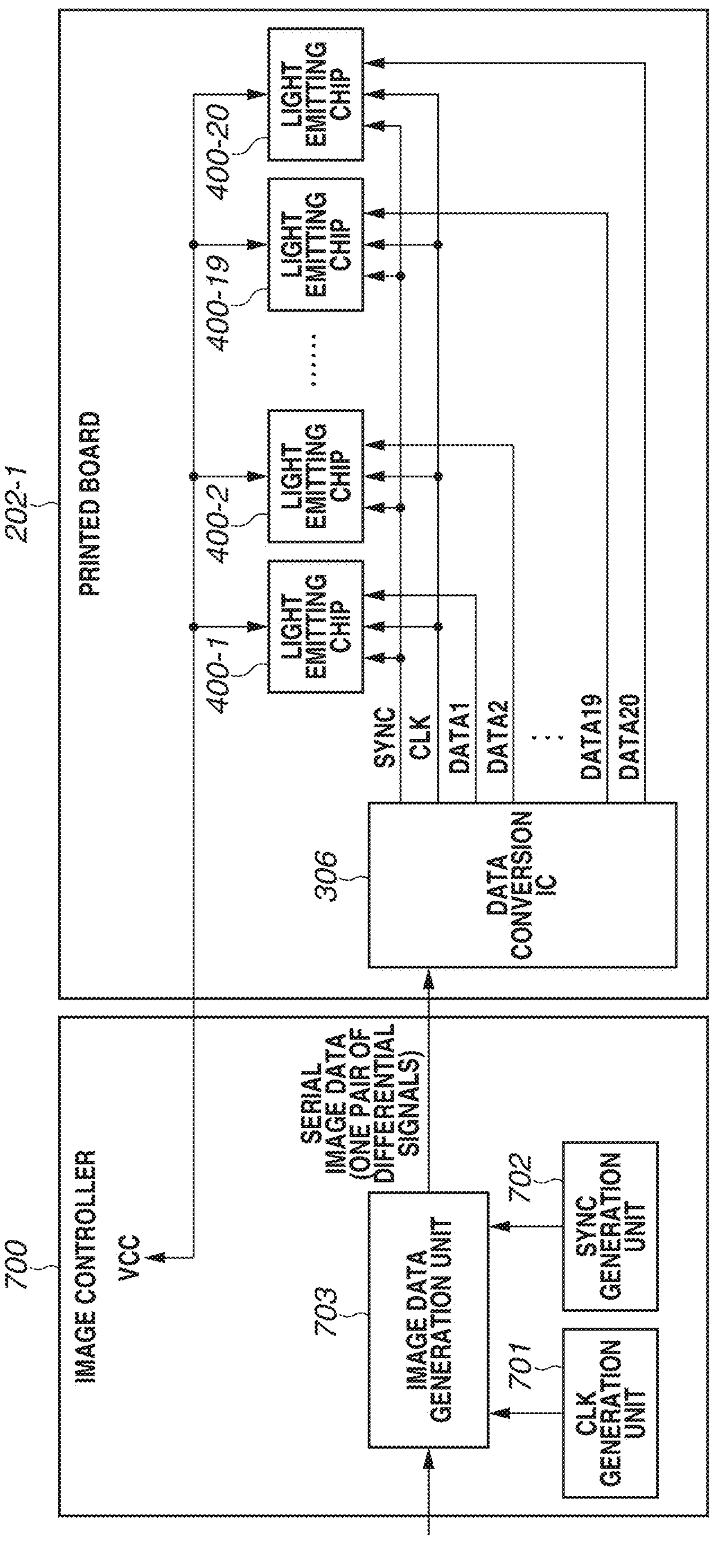
FIG. 7 is a control block diagram according to the first exemplary embodiment.

FIG. 7 is a block diagram of an image controller 700 and a printed board 202-1 on which the 20 light emitting chips 400 are mounted.

In relation to the present exemplary embodiment, processing in a single color will be described for the sake of simplicity. However, the processing is performed in the four colors in parallel at the same time.

The image controller 700 transmits signals for controlling the 20 light emitting chips 400-1 to 400-20 mounted on the printed board 202.

The image controller 700 includes a CLK generation unit 701, a SYNC generation unit 702, and an image data generation unit 703.

The CLK generation unit 701 generates a CLK signal equivalent to a lighting frequency of the chips in accordance with a printing speed, and transmits the CLK signal to the image data generation unit 703.

The SYNC generation unit 702 generates a line synchronization signal equivalent to a printing time of one line, and transmits the line synchronization signal to the image data generation unit 703.

The image data generation unit 703 performs a dithering process on the image data received from the scanner unit 100 or the outside of the image forming apparatus at a predetermined resolution to generate serial image data for print output. In the present exemplary embodiment, the dithering process is performed at a resolution of 1200 dpi in both the main-scanning direction and the sub-scanning direction. The image data generation unit 703 converts the image data having undergone the dithering process into a format that is suitable for an arrangement order of the light emitting points 602 in the 20 light emitting chips 400, and further outputs the image data as a pair of differential signals (serial image data).

Further, the image data generation unit 703 superimposes the CLK signal input from the CLK generation unit 701 and the SYNC signal input from the SYNC generation unit 702 on the serial image data, and outputs the serial image data.

The serial image data is input to the data conversion IC 306 on the printed board 202-1 through a flexible flat cable (not illustrated) and the connector 305. The data conversion IC 306 converts the serial image data again into a format that is suitable for the arrangement order of the light emitting points 602 in the 20 light emitting chips 400, and outputs parallel image data (DATA1 to DATA20) respectively corresponding to the light emitting chips 400-1 to 400-20, a clock (CLK) signal that is a common signal for all the chips, and a line synchronization (SYNC) signal that is a common signal for all the chips.

Figure 8:
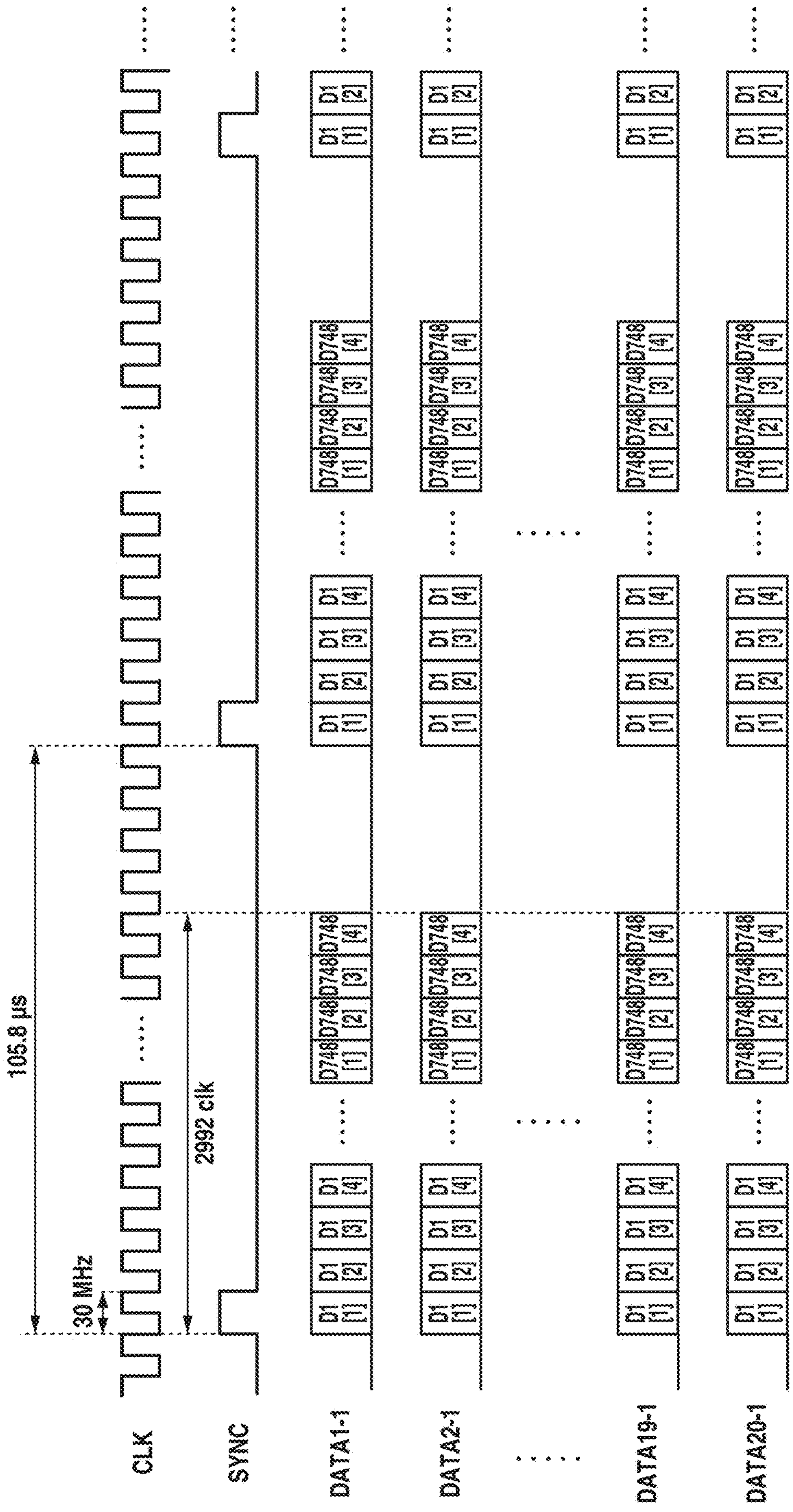
FIG. 8 is a timing chart illustrating signals transmitted from a data conversion integrated circuit (IC) to the light emitting chips according to the first exemplary embodiment.

FIG. 8 is a timing chart that indicates signals transmitted from the data conversion IC 306 to the light emitting chips 400.

The data conversion IC 306 separates CLK, SYNC, and the image data (DATA1 to DATA20) for the 20 chips from the serial image data, and outputs the signals therefor in parallel.

The CLK signal is a signal at a predetermined frequency generated by the CLK generation unit 701, and is a common signal for the light emitting chips 400.

The SYNC signal is a line synchronization signal that is output in synchronization with the CLK signal, and is generated such that, with respect to a predetermined rotation speed of the photoconductive drum 102, a cycle in which the surface of the photoconductive drum 102 moves about 21.16 μm, which is equivalent to one pixel at 1200 dpi, in a rotation direction is defined as one line cycle. For example, if the printing speed is 200 mm/s, the one line cycle is set to 105.8 μs (two and subsequent places of decimals are omitted). Similar to the CLK signal, the SYNC signal is a common signal for the light emitting chips 400.

The DATA1 to DATA20 signals are image data signals corresponding to the light emitting chips (400-1 to 400-20), respectively, and are transmitted simultaneously to the light emitting chips in synchronization with the CLK signal and the SYNC signal. In the case of transmitting the image data, it is necessary to transmit data corresponding to 748×4 rows=2992 light emitting points 602 during the one line cycle of 105.8 μs with the rising of the SYNC signal as a reference. Thus, in this example, a CLK frequency can be set to 28.3 MHz or higher. In the present exemplary embodiment, the CLK frequency is set to 30 MHz.

On the other hand, since the serial image data output from the image data generation unit 703 is transmitted as a pair of differential signals including the image data for the 20 chips, CLK, and SYNC, the frequency of the signals is 20 times or more higher than the frequency of the DATA signals. In the present exemplary embodiment, the serial image data is transmitted at 650 Mbps.

The 20 light emitting chips 400-1 to 400-20 are mounted on the printed board 202, and signal lines on the printed board 202 and the WB pads 408 on the light emitting chips 400 are connected by metal wires. The light emitting chips 400 are supplied with the signals from the data conversion IC 306 and a voltage at a common collector (VCC) as a power supply from the image controller 700.

Figure 9:
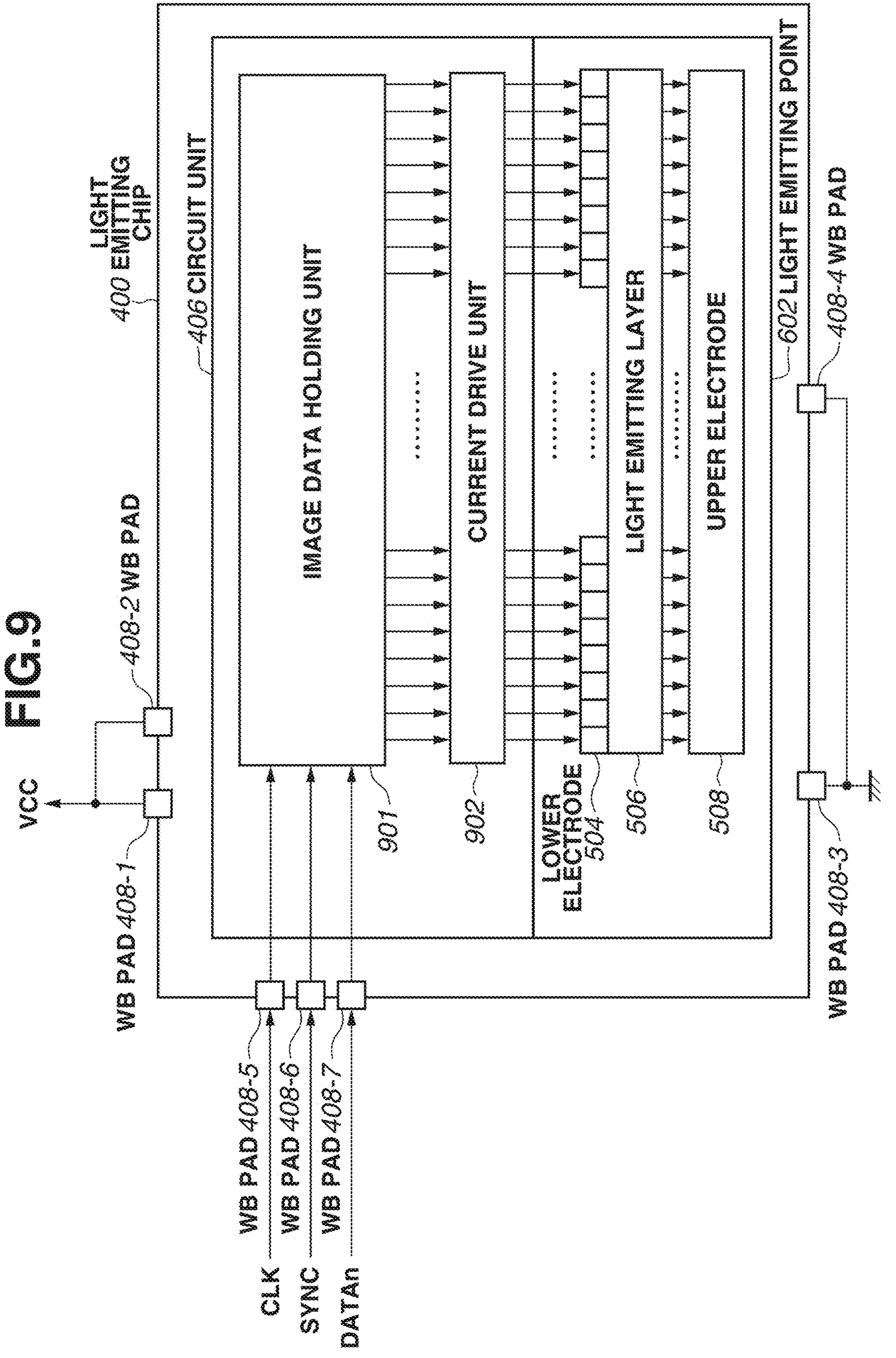
FIG. 9 is a block diagram of a circuit in a light emitting chip according to the first exemplary embodiment.

FIG. 9 illustrates a block diagram of the light emitting chip 400.

The light emitting chip 400 includes seven WB pads (408-1 to 408-7). When the WB pads and the signal lines on the printed board 202 are connected by the metal wires, the signals from the data conversion IC 306 are input to the WB pads.

The WB pads 408-1 and 408-2 are connected to the VCC to supply power to the light emitting chip 400. The WB pads 408-3 and 408-4 are grounded and connected to the ground (GND) of the circuit unit 406 described below and the upper electrode 508. The WB pad 408-5 is a terminal to which the CLK signal is input, the WB pad 408-6 is a terminal to which the SYNC signal is input, and the WB pad 408-7 is a terminal to which the DATAn signal is input.

The light emitting chip 400 includes the circuit unit 406 and the light emitting points 602. The circuit unit 406 includes an image data holding unit 901 and a current drive unit 902.

The image data holding unit 901 receives the CLK signal from the WB pad 408-5, the SYNC signal from the WB pad 408-6, and the image data (DATAn) signal from the WB pad 408-7. Then, the image data holding unit 901 holds the image data for 748 light emitting points×4 rows, and transmits a drive signal to the current drive unit 902 at the timing of receiving the image data from the last light emitting point.

Figure 10:
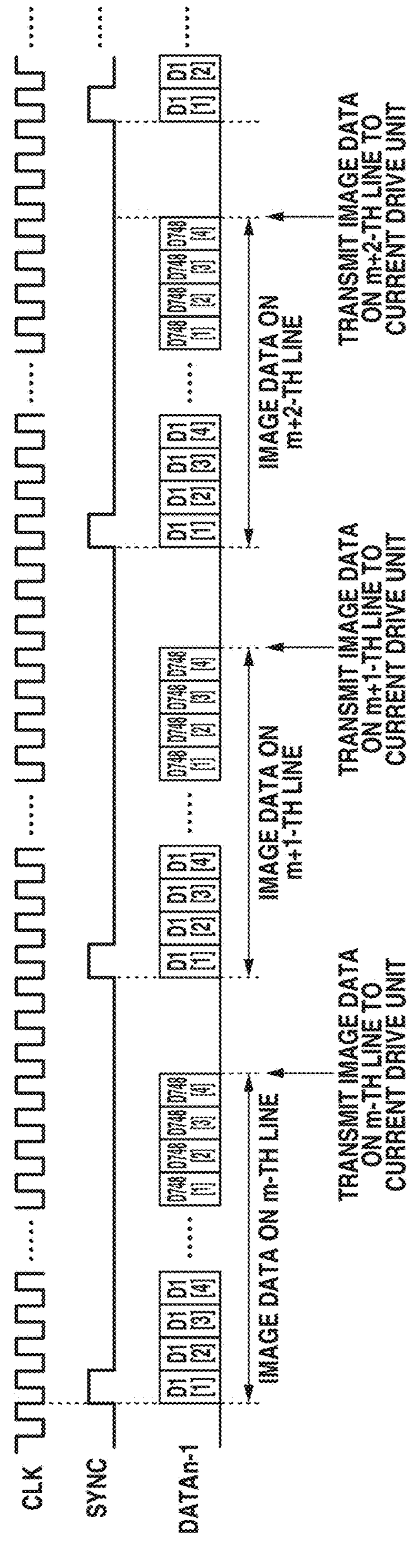
FIG. 10 is an operation timing chart of an image data holding unit according to the first exemplary embodiment.

FIG. 10 is an operation timing chart of the image data holding unit 901. FIG. 10 illustrates timings for an m-th line to an m+2-th line for the simplicity of description. In the present exemplary embodiment, the image data holding unit 901 transmits the drive signal to the current drive unit 902 at a timing of receiving the image data (DATAn) signal and receiving all the image data for 748 pixels×4 rows on the m-the line. Similarly, the image data holding unit 901 transmits a drive signal to the current drive unit 902 at a timing of receiving all the image data for 748 pixels×4 rows on the subsequent m+1-th line and the m+2-th line. Repeating this operation makes it possible to form a two-dimensional image on the photoconductive drum 102.

In the present exemplary embodiment, the image data holding unit 901 transmits the drive signal to the current drive unit 902 at the timing of receiving all the image data for 748 pixels×4 rows. Alternatively, the image data holding unit 901 may transmit a drive signal to the current drive unit 902 in the sequence of data reception.

Figure 11:
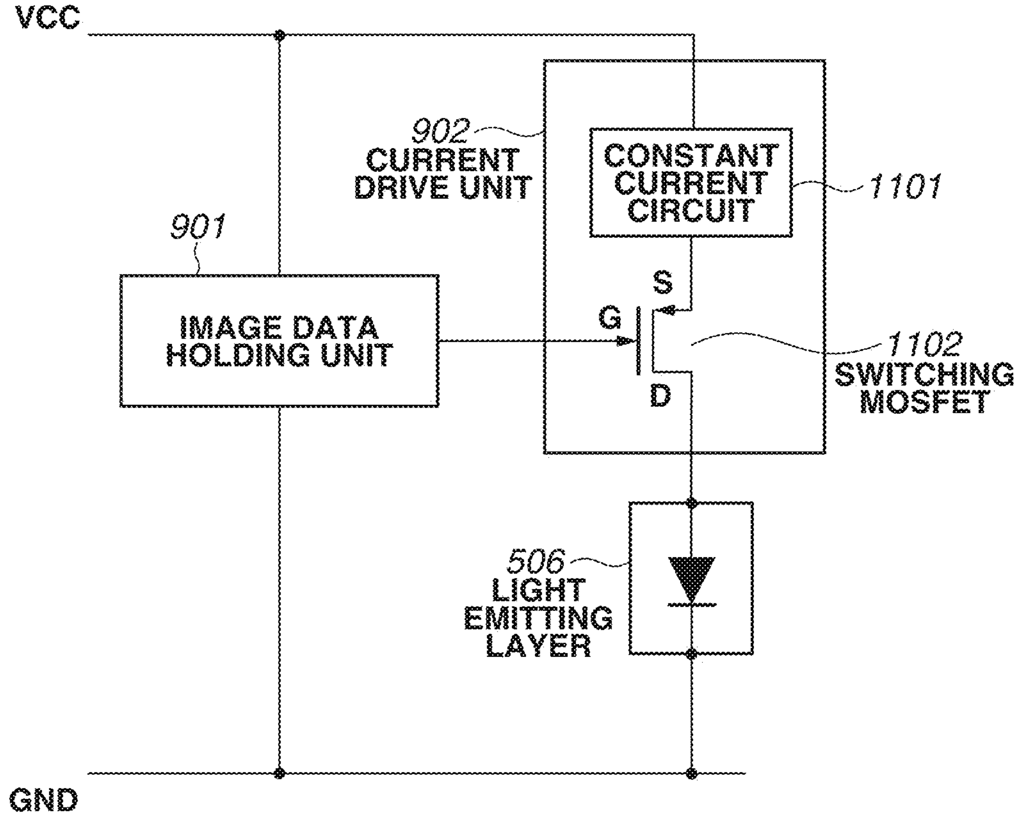
FIG. 11 is a block diagram of a circuit of a current drive unit according to the first exemplary embodiment.

FIG. 11 illustrates a configuration of the current drive unit 902.

The current drive unit 902 is connected to each of the light emitting points 602 on a one-to-one basis. In the present exemplary embodiment, only one light emitting point 602 will be described for the sake of simplicity. However, there is the same number of current drive units 902 as the number of the light emitting points 602. More specifically, in the present exemplary embodiment, there are 748×4 rows=2992 current drive units 902 for one light emitting chip 400.

The current drive unit 902 includes a constant current circuit 1101 and a switching metal-oxide semiconductor field-effect transistor (MOSFET) 1102.

The constant current circuit 1101 is a circuit that supplies a constant current to each light emitting point 602. In the present exemplary embodiment, one constant current circuit 1101 is provided for each light emitting point 602. Alternatively, one common circuit may be provided for a plurality of light emitting points 602 in order to reduce the circuit size.

The switching MOSFET 1102 in the present exemplary embodiment is a p-channel MOSFET in which the source terminal is connected to the constant current circuit 1101 and the drive signal output from the image data holding unit 901 is input to the gate terminal. The drive signal is a binary signal of High level or Low level. When the drive signal of High level is input, the switching MOSFET 1102 is turned on so that the current generated by the constant current circuit 1101 flows from the source to the drain. The drain terminal is connected to the light emitting layer 506 via the lower electrodes 504, and the light emitting points 602 emit light when the current flows.

Figure 12:
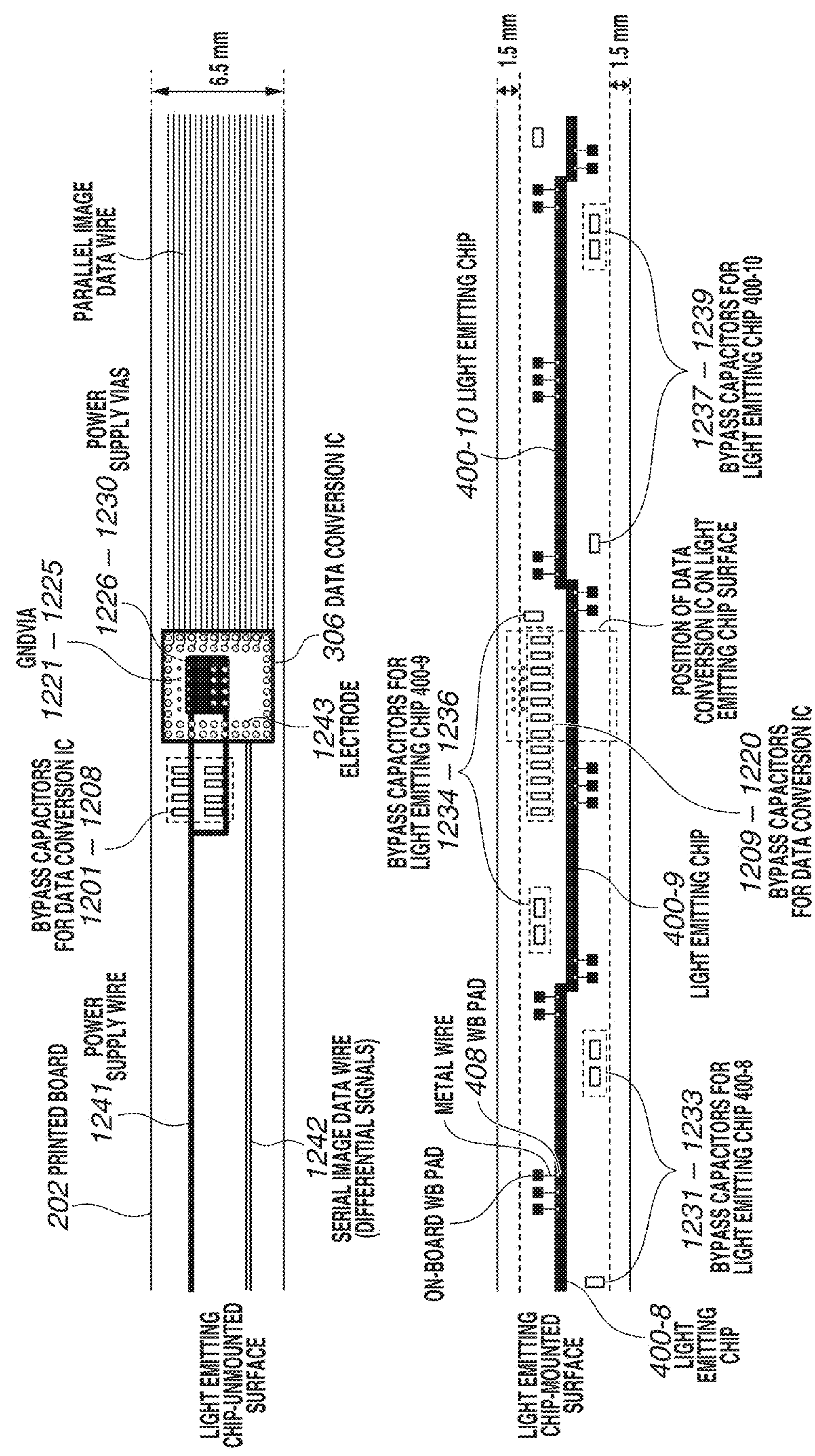
FIG. 12 is a diagram illustrating component arrangement on a printed board according to the first exemplary embodiment.

FIG. 12 is a diagram illustrating component arrangement and wiring on the printed board 202 according to the present exemplary embodiment.

In the present exemplary embodiment, the circuit board size is 330 mm×6.5 mm. FIG. 12 illustrates only an area of 50 mm×6.5 mm near the data conversion IC 306 for the simplicity of description.

In the present exemplary embodiment, the printed board 202 has an eight-layer structure. FIG. 12 illustrates only the light emitting chip-mounted surface of the surface layer and the light emitting chip-unmounted surface on which the data conversion IC 306 is mounted, for the simplicity of description. However, the number of layers of the printed board 202 is not limited to eight.

On the light emitting chip-unmounted surface, the connector 305 (not illustrated), the data conversion IC 306, bypass capacitors 1201 to 1208 for the data conversion IC 306 are arranged. In the present exemplary embodiment, the data conversion IC 306 is arranged on the back of the light emitting chips 400-9 arranged on the light emitting chip-mounted surface. Further, bypass capacitors 1209 to 1220 for the data conversion IC 306 are provided on the light emitting chip-mounted surface. More specifically, the bypass capacitors 1209 to 1220 provided on the light emitting chip-unmounted surface of the printed board 202 (the back surface of the printed board 202) correspond to a first bypass capacitor.

In the present exemplary embodiment, since the data conversion IC 306 is a ball-grid-array (BGA) package in which terminals are formed on the bottom surface of the package, FIG. 12 also illustrates electrodes and vias on the bottom surface of the package for the sake of description.

A power supply wire 1241 and a serial image data wire 1242 are connected to the data conversion IC 306 from the connector 305 (not illustrated). The data conversion IC 306 has a plurality of electrodes 1243, and the power supply wire 1241 is connected to each of the electrodes 1243, so that power is supplied from the plurality of electrodes 1243 to the data conversion IC 306. In addition, parallel image data wires including wires for CLK and SYNC are drawn out of the data conversion IC 306 and are connected to the light emitting chips 400-1 to 400-20.

The bypass capacitors 1201 to 1220 for the data conversion IC 306 are arranged between the power supply wire 1241 and the GND. More specifically, the bypass capacitors 1201 to 1220 each have one end electrically connected to the power supply wire 1241 and the other end electrically connected to the GND. The bypass capacitors 1201 to 1220 are merely electrically connected to the power supply wire 1241 and the GND, and thus other electronic components may be electrically connected between the bypass capacitors 1201 to 1220 and the power supply wire 1241. Since the bypass capacitors 1201 to 1220 are provided between the power supply wire 1241 and the GND, a high-frequency noise component included in the power supply wire 1241 flows to the GND through the bypass capacitors, whereby it is possible to reduce the high-frequency noise component flowing to the data conversion IC 306. The GND here refers to a potential serving as a reference in a circuit on the printed board 202.

Since impedance between the bypass capacitors 1201 to 1220 and the electrodes 1243 may cause noise, the length of the wires between the bypass capacitors 1201 to 1220 and the electrodes 1243 is desirably as short as possible from the viewpoint of reducing noise flowing into the data conversion IC 306. Thus, the bypass capacitors 1201 to 1220 need to be arranged close to the data conversion IC 306. However, if the width of the circuit board in the shorter side direction is small as in the present exemplary embodiment, the bypass capacitors can be arranged only on the left side of the data conversion IC 306 because the parallel image data wires are dense on the right side of the data conversion IC 306.

Thus, in the present exemplary embodiment, the power supply wire 1241 is turned back to the light emitting chip-mounted surface via power supply vias 1226 to 1230, and the bypass capacitors 1209 to 1220 for the data conversion IC 306 are arranged on the light emitting chip-mounted surface.

Since the thickness of a printed board is generally about 0.6 to 1.6 mm, arranging bypass capacitors on the back surface of the data conversion IC 306 enables a large number of bypass capacitors to be arranged close to the IC.

Arranging the bypass capacitors on the light emitting chip-mounted surface as in the present exemplary embodiment makes it possible to arrange the bypass capacitors close to the data conversion IC 306 even in a case where it is difficult to arrange the bypass capacitors on the same surface as the data conversion IC 306 due to a wiring limitation or the like.

When the bypass capacitors 1209 to 1220 are provided on the light emitting chip-mounted surface, the bypass capacitors 1209 to 1220 are desirably arranged as close as possible to the data conversion IC 306. In the present exemplary embodiment, the bypass capacitors 1209 to 1220 are provided at positions overlapping the data conversion IC 306. Alternatively, the bypass capacitors 1209 to 1220 may be provided at positions overlapping the printed board 202 at least either in the longer side direction or shorter side direction. The bypass capacitors 1209 to 1220 may be provided at positions not overlapping the data conversion IC 306 depending on the layout of electronic components on the light emitting chip-mounted surface of the printed board 202. Also in this case, the bypass capacitors 1209 to 1220 are desirably provided at positions as close as possible to the data conversion IC 306.

The bypass capacitors are desirably provided to all the electrodes 1243 to which the power is supplied on the data conversion IC 306. In the present exemplary embodiment, at least one bypass capacitor is provided to each of the electrodes 1243 to which the power supply wire 1241 is connected. The bypass capacitors vary in frequency of noise that the bypass capacitors can remove depending on the capacity thereof. Providing a plurality of bypass capacitors different in capacity for one electrode 1243 makes it possible to remove noise of a wide variety of frequencies as compared to a case where the bypass capacitors with the same capacity are provided.

In the present exemplary embodiment, the bypass capacitors 1201 to 1208 are provided on the surface of the printed board 202 on which the data conversion IC 306 is mounted, and the bypass capacitors 1209 to 1220 are provided on the light emitting chip-mounted surface of the printed board 202. However, the arrangement of the bypass capacitors is not limited to this. In other words, all the bypass capacitors may be provided on the light emitting chip-mounted surface of the printed board 202.

Since the light emitting chips 400 are provided on the surface of the printed board 202 on which the data conversion IC 306 is not mounted, there may be a restriction on arrangement of the bypass capacitors 1209 to 1220. Since it is possible to select a surface to arrange the bypass capacitors 1209 to 1220 from both surfaces of the printed board 202, the arrangement of the bypass capacitors 1209 to 1220 can be freely selected in accordance with electronic components on the printed board 202.

On the light emitting chip-mounted surface, there are the 20 light emitting chips 400-1 to 400-20 (FIG. 12 illustrates only the light emitting chips 400-8 to 400-10) and the bypass capacitors 1209 to 1220 and 1231 to 1239 connected between the power supply wire and the GND.

The light emitting chips 400-1 to 400-20 are fixed to the printed board 202 with an adhesive (not illustrated) (hereinafter, this step will be called die-bonding), and after that, the WB pads 408 on the light emitting chips 400 and the on-board WB pads on the printed board 202 are connected together via metal wires.

The bypass capacitors 1231 to 1233 are bypass capacitors for power supply to the light emitting chip 400-8, the bypass capacitors 1234 to 1236 are bypass capacitors for power supply to the light emitting chip 400-9, the bypass capacitors 1237 to 1239 are bypass capacitors for power supply to the light emitting chip 400-10, and the bypass capacitors 1209 to 1220 are bypass capacitors for power supply to the data conversion IC 306 arranged on the light emitting chip-unmounted surface. The impedance of the bypass capacitors 1231 to 1239 provided to the light emitting chips 400 due to the wire length is desirably as low as possible. Thus, the bypass capacitors 1209 to 1239 are respectively disposed close to and adjacent to the light emitting chips 400. Further, in order to dispose the bypass capacitors 1209 to 1239 even closer to the light emitting chips 400, the light emitting chips 400 and the bypass capacitors 1209 to 1239 are desirably disposed adjacent to each other on the printed board 202. Thus, in the present exemplary embodiment, the light emitting chips 400 and the bypass capacitors 1209 to 1239 are provided on the same surface of the printed board 202. More specifically, the bypass capacitors 1209 to 1239 correspond to a second bypass capacitor. Further, the bypass capacitors 1209 to 1220 and 1231 to 1239 according to the present exemplary embodiment are lower in height than the light emitting chips 400-1 to 400-20. This makes it possible to, in the case of removing dirt on the surfaces of the light emitting chips 400 with an adhesive sheet, prevent the adhesive sheet from contacting the bypass capacitors.

In the present exemplary embodiment, the height of the light emitting chips 400 is 400 μm and the height of the bypass capacitors is 300 μm. However, the present disclosure is not limited to these dimensions.

The bypass capacitors 1209 to 1220 arranged on the light emitting chip-mounted surface are arranged at positions that overlap the position of at least one of the bypass capacitors 1231 to 1239 for light emitting chip in the shorter side direction of the printed board 202. The bypass capacitors 1209 to 1220 and 1231 to 1239 are arranged at positions 1.5 mm or more away from the outer periphery of the printed board 202 in the shorter side direction. This is because, in die-bonding the light emitting chips 400 to the printed board 202, a metal sheet for preventing warping of the printed board 202 is to be arranged at 1.5 mm from the outer periphery of the metal sheet.

On the other hand, the bypass capacitors 1209 to 1220 and 1231 to 1239 are arranged at positions 0.7 mm or more away from the light emitting chips 400-1 to 400-20. This is done for a purpose of preventing interference by collets holding the light emitting chips 400 at the time of die-bonding.

The bypass capacitors 1209 to 1220 and 1231 to 1239 are further arranged at positions 1.5 mm or more away from the on-board WB pads. This is done for a purpose of, in connecting the bypass capacitors and the printed board 202 by soldering, preventing flux included in the solder from scattering and attaching to the on-board WB pads.

Although there are a power source and signal wires on the light emitting chip-mounted surface, they are not illustrated in the drawing for a purpose of avoiding complicated illustration.

As described above, since the bypass capacitors for the data conversion IC 306 arranged on the light emitting chip-unmounted surface are arranged on the light emitting chip-mounted surface, it is possible to arrange a large number of bypass capacitors close to the data conversion IC 306, thereby achieving stable quality of the power supply voltage.

The size and the number of layers of the printed board and the number of bypass capacitors are not limited to the above ones. In addition, the package and the number of electrodes of the data conversion IC 306 are not limited to the above ones.

In the present exemplary embodiment, the configuration is described where 20 light emitting chips are connected to one data conversion IC. However, the number of data conversion ICs and the number of light emitting chips are not limited to the above ones.

In the present exemplary embodiment, the data conversion IC 306 is used as an example of the IC. However, the IC arranged on the printed board 202 is not limited to this and may be another IC. For example, a drive IC for controlling turn-on and turn-off of the light emitting points 602 may be provided on the printed board 202. Since the power supply voltage is likely to fluctuate not only in an image data transmission IC but also in an IC that transmits and receives high-speed signals, it is necessary to arrange the bypass capacitors close to the IC. Also in this case, providing the bypass capacitors on the IC-unmounted surface as described above in the present exemplary embodiment makes it possible to arrange the bypass capacitors close to the IC even in a case where a space on the printed board is limited.

According to the present disclosure, it is possible to provide an exposure head that reduces the possibility of not being able to arrange the bypass capacitor close to the IC.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-097771, filed Jun. 14, 2023, which is hereby incorporated by reference herein in its entirety.

What is claimed is:

1. An exposure head comprising:

a circuit board having a longer side and a shorter side, the longer side being longer in a direction of a rotation axis of a photoconductor than the shorter side;

a light emitting chip configured to emit light to expose the photoconductor that is rotating around the rotation axis, wherein the light emitting chip includes a plurality of light emitting units arranged in a longer side direction of the circuit board, and the light emitting chip is disposed on a front surface of the circuit board;

an integrated circuit (IC) disposed on a back surface of the circuit board and configured to transfer image data for controlling turn-on and turn-off of the plurality of light emitting units to the light emitting chip;

a power supply wire configured to supply a current from a power source to the IC; and a bypass capacitor disposed on the front surface and configured to be electrically connected to the power supply wire and a ground.

2. The exposure head according to claim 1, wherein the bypass capacitor is disposed at a position overlapping the IC in the longer side direction.

3. An exposure head comprising:

a circuit board;

a light emitting chip configured to emit light to expose a photoconductor, the light emitting chip disposed on a front surface of the circuit board and including a plurality of light emitting units arranged in a longer side direction of the circuit board;

an integrated circuit (IC) disposed on a back surface of the circuit board and configured to transfer image data for controlling turn-on and turn-off of the plurality of light emitting units;

a power supply wire configured to supply a current from a power source to the IC; and a bypass capacitor disposed on the front surface and configured to be electrically connected to the power supply wire and a ground, wherein the bypass capacitor is disposed at a position overlapping the IC in a shorter side direction of the circuit board.

4. The exposure head according to claim 1, wherein the IC is configured to convert the image data that is serial data into parallel data and to transfer the parallel data to the light emitting chip.

5. The exposure head according to claim 1, wherein the power supply wire is configured to supply the current from the power source to the IC and the light emitting chip.

6. The exposure head according to claim 5, wherein the bypass capacitor is a first bypass capacitor, the exposure head further comprising a second bypass capacitor electrically connected to the power supply wire and the ground, wherein the second bypass capacitor is disposed adjacent to the light emitting chip on the front surface.

7. The exposure head according to claim 1, wherein the power supply wire is disposed on the back surface, and the bypass capacitor is connected to the power supply wire via a power supply via.

8. An exposure head comprising:

a circuit board;

a light emitting chip configured to emit light to expose a photoconductor, the light emitting chip disposed on a front surface of the circuit board and including a plurality of light emitting units arranged in a longer side direction of the circuit board;

an integrated circuit (IC) disposed on a back surface of the circuit board and configured to transfer image data for controlling turn-on and turn-off of the plurality of light emitting units;

a power supply wire configured to supply a current from a power source to the IC; and a bypass capacitor disposed on the front surface and configured to be electrically connected to the power supply wire and a ground, wherein the bypass capacitor is a first bypass capacitor, the exposure head further comprising a second bypass capacitor connected to the power supply wire and the ground, and wherein the second bypass capacitor is disposed on the back surface.

9. The exposure head according to claim 1, wherein the IC includes a plurality of electrodes, and the power supply wire supplies the current from the power source to each of the plurality of electrodes.

10. The exposure head according to claim 9, further comprising a plurality of bypass capacitors, wherein each of the plurality of bypass capacitors is disposed in correspondence with each power supply wire that supplies the current to each of the plurality of electrodes.

11. The exposure head according to claim 1, further comprising a plurality of bypass capacitors, wherein at least two of the plurality of bypass capacitors are different in capacity.

12. The exposure head according to claim 1, wherein the plurality of light emitting units is organic electroluminescence (EL) units.

13. An image forming apparatus comprising:

a photoconductor that is rotating; and the exposure head according to claim 1, wherein the exposure head is configured to expose the photoconductor.

14. The image forming apparatus according to claim 13, wherein the plurality of light emitting units is organic electroluminescence (EL) units.

15. The exposure head according to claim 1, wherein the plurality of light emitting units are arranged in a form of a plurality of rows, wherein each of the plurality of rows extends in the longer side direction of the circuit board, and wherein the plurality of rows are arranged in a shorter side direction of the circuit board.

16. The exposure head according to claim 15, wherein the plurality of light emitting units is organic electroluminescence (EL) units.

* * * * *